United States Patent
Tewinkle

(10) Patent No.: US 8,212,903 B2
(45) Date of Patent: Jul. 3, 2012

(54) SENSOR ARRAY WITH SELECTABLE RESOLUTION AND METHOD THEREOF

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 386 days.

(21) Appl. No.: 12/533,859

(22) Filed: Jul. 31, 2009

(65) Prior Publication Data

US 2011/0025863 A1    Feb. 3, 2011

(51) Int. Cl.
   *H04N 5/335* (2011.01)
(52) U.S. Cl. .................................. 348/300; 348/294
(58) Field of Classification Search .............. 348/294, 348/300
   See application file for complete search history.

(56) References Cited

U.S. PATENT DOCUMENTS

| | | | |
|---|---|---|---|
| 5,081,536 A | 1/1992 | Tandon et al. | |
| 6,958,833 B2 | 10/2005 | TeWinkle | |
| 7,471,327 B2 | 12/2008 | Hosier et al. | |
| 2003/0214476 A1 * | 11/2003 | Matsuda et al. | 345/100 |
| 2004/0046879 A1 * | 3/2004 | Ohzu et al. | 348/243 |
| 2005/0179795 A1 * | 8/2005 | Funatsu et al. | 348/302 |
| 2006/0007335 A1 * | 1/2006 | Machida et al. | 348/300 |
| 2006/0108506 A1 * | 5/2006 | Yang et al. | 250/208.1 |
| 2007/0229687 A1 * | 10/2007 | Hiyama et al. | 348/294 |
| 2008/0094671 A1 | 4/2008 | TeWinkle et al. | |
| 2009/0091648 A1 * | 4/2009 | Lin et al. | 348/301 |
| 2011/0128425 A1 * | 6/2011 | Schemmann et al. | 348/300 |

* cited by examiner

*Primary Examiner* — James Hannett
(74) *Attorney, Agent, or Firm* — Simpson & Simpson, PLLC

(57) ABSTRACT

A sensor array, including: a plurality of pixels; first and second video lines; and a plurality of intermediate circuits. Each intermediate circuit is electrically connected to a respective pixel from the plurality of pixels and electrically connected to both the first and second video lines. A method for modifying resolution of a sensor array, the array including first and second video lines, a plurality of pixels, and a plurality of intermediate circuits; and, including: electrically connecting each intermediate circuit to a respective pixel and to the first and second video lines; for a first mode, transmitting a signal from a pixel in the plurality of pixels to the first video line via a respective intermediate circuit from the plurality of intermediate circuits; and for a second mode, transmitting a signal from the pixel to the second video line via the respective intermediate circuit from the plurality of intermediate circuits.

18 Claims, 6 Drawing Sheets

SENSOR ARRAY WITH SELECTABLE RESOLUTION AND METHOD THEREOF

TECHNICAL FIELD

The present disclosure relates to a sensor array with capability of operating at a plurality of selectable resolution levels.

BACKGROUND

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors. A basic circuitry for such an image sensor array is given in U.S. Pat. No. 5,081,536, the disclosure of which is incorporated herein by reference in its entirety.

A desirable feature of a photosensitive apparatus having an array of photosensors is the capability for multiple selectable imaging resolutions. For example, if a chip includes a set of photosensors spaced 600 to the inch, it may be desirable to operate the chip so that each adjacent pair of photosensors in effect operates as one photosensor, so that the effective spatial resolution of the apparatus is 300 spots per inch. A lower spatial resolution results in smaller image file sizes (which may be desirable in some scanning contexts, such as archiving, or pattern or character recognition) and can facilitate a higher readout rate.

FIG. 7 is a block diagram of prior art sensor array 400. Each pixel in the sensor array is connected to a pixel amplifier which is connected to one of video lines VIDO or VIDE. The amplifiers are connected in an alternating sequence to one of an odd or an even pixel shift register 402O or 402E. The odd pixel registers are activated on a rising pulse from the CLK input and the even pixel registers are activated on a falling pulse from CLK. The PXO and PXE outputs from the registers activate a video line switch for a respective pixel amplifier so that the respective pixel amplifier transmits to a respective video line. Thus, the prior art teaches a sensor array which operates at a fixed resolution dependent upon the configuration of the pixels, and has a fixed readout time, linked to the resolution. For a desired resolution reduction, the prior art teaches producing image data with unnecessarily high data rates and then adjusting resolution by processes outside of the sensor array. Thus, all of the pixels are readout and processed even though only a portion of the pixels are actually needed for the desire resolution.

U.S. Pat. No. 6,958,833, the disclosure of which is incorporated herein by reference in its entirety, describes the operation of shift registers in a sensor array, for example, describing a photosensitive apparatus including a plurality of photosensors organized in a set of groups of photosensors, and a video output line for accepting image-related video signals from the photosensors. Selection means activate a subset of groups of photosensors so that only the activated subset of groups of photosensors outputs image signals onto the video output line to record an image.

U.S. Pat. No. 7,471,327, the disclosure of which is incorporated herein by reference in its entirety, describes a photosensitive imaging apparatus with a linear array of groups of photosensors. In a low-resolution scanning mode, all of the photosensors in each group act together as one large photosensor. In a high-resolution scanning mode, each photosensor in a group acts outputs image-based signals independently. In either mode, the signals output by the photosensors are transferred to one of two output lines, such as for "odd-" and "even-" positioned photosensors or groups of photosensors. The signals on the two lines can then be multiplexed to a single output line. The dual output lines enable fast signal output in either resolution mode.

SUMMARY

According to aspects illustrated herein, there is provided a sensor array, including: a plurality of pixels; first and second video lines; and a plurality of intermediate circuits. Each intermediate circuit is electrically connected to a respective pixel from the plurality of pixels and electrically connected to both the first and second video lines.

According to aspects illustrated herein, there is provided a method for modifying resolution of a sensor array, the array including first and second video lines, a plurality of pixels, and a plurality of intermediate circuits; and, including: electrically connecting each intermediate circuit to a respective pixel and to the first and second video lines; for a first mode, transmitting a signal from a pixel in the plurality of pixels to the first video line via a respective intermediate circuit from the plurality of intermediate circuits; and for a second mode, transmitting a signal from the pixel in the plurality of pixels to the second video line via the respective intermediate circuit from the plurality of intermediate circuits.

According to aspects illustrated herein, there is provided an apparatus for modifying resolution of an image, including: a sensor array including: first and second video lines; a plurality of pixels; and a plurality of intermediate circuits. Each intermediate circuit is electrically connected to a respective pixel and to the first and second video lines. The apparatus also includes a processor for at least one specially programmed computer for controlling signals from the plurality of pixels to the first and second video lines via the plurality of intermediate circuits.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 6:
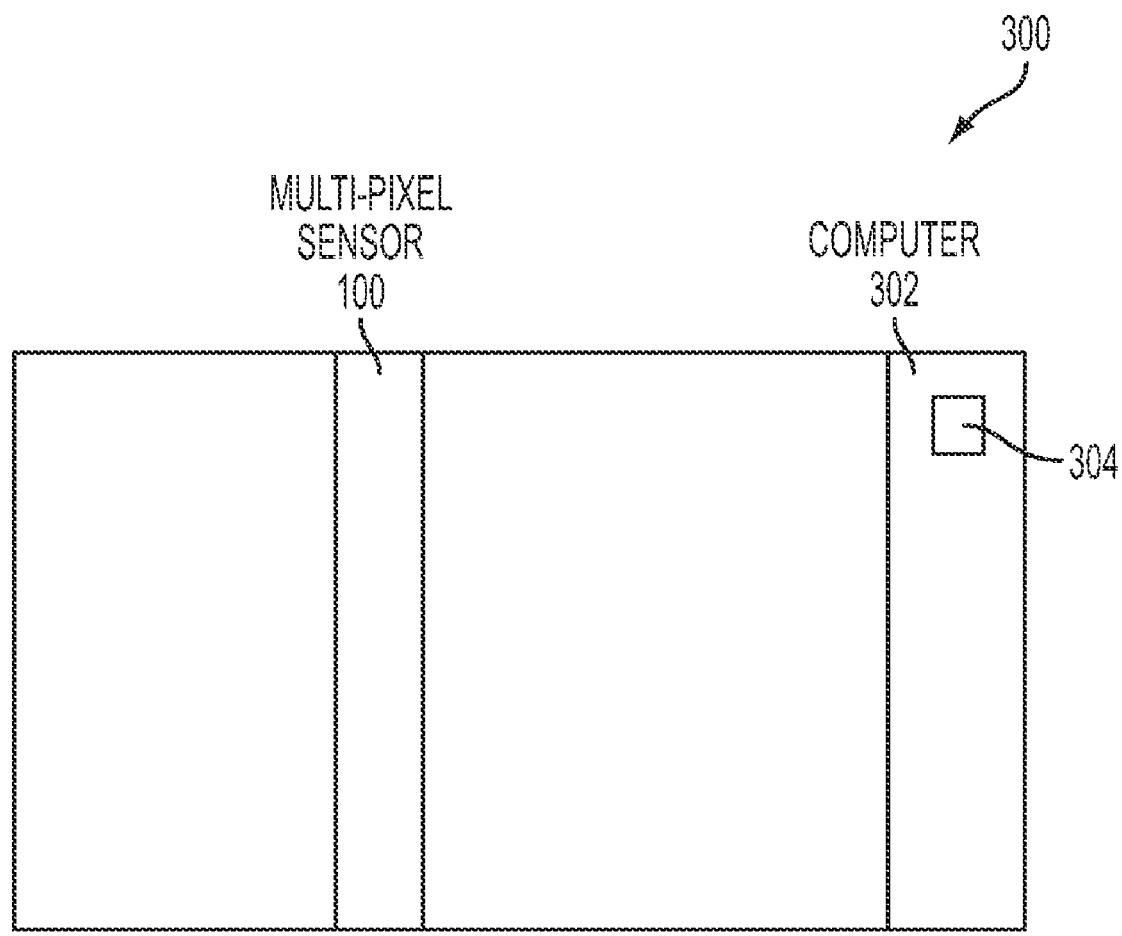
FIG. 6 is a block diagram of an apparatus including a sensor array.

FIG. 6 is a block diagram of an apparatus including a sensor array. The apparatus can be a digital scanner, copier, facsimile machine, or other document generating or reproducing device. In response to operation of the apparatus, signals from the pixels are processed, for example, by a computer onboard the apparatus.

Figure 1:
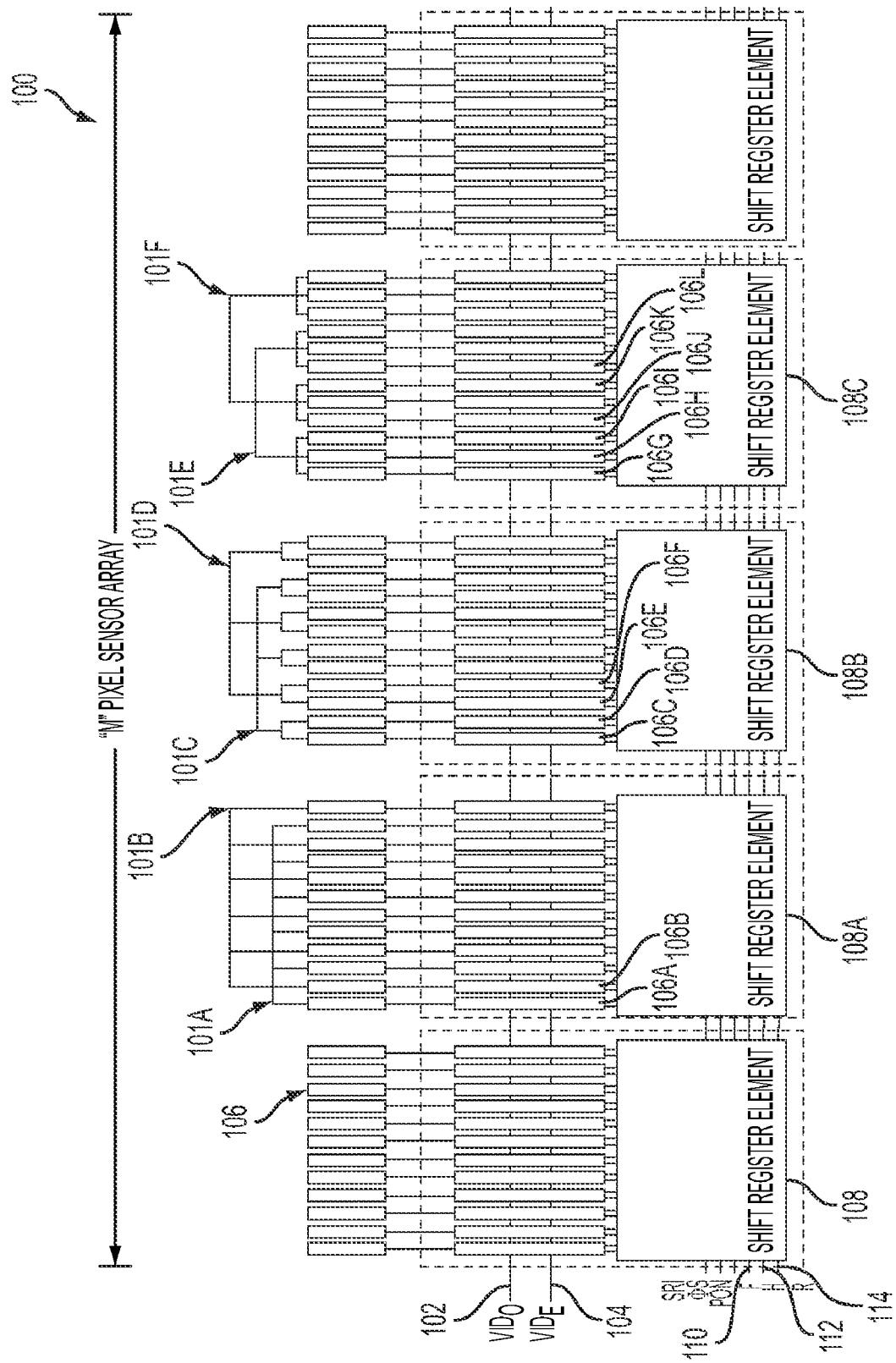
FIG. 1 is a block diagram of a sensor array with selectable resolution.

FIG. 1 is a schematic drawing of sensor array 100 with selectable sampling resolution. Sensor array 100 includes a plurality of pixels 101, odd video line 102, and even video line 104. Each pixel has respective electrical connections to both the first and second video lines as further described infra. In an example embodiment, the sensor array includes a plurality of intermediate circuits 106, each intermediate circuit electrically connected to a respective pixel and to the first and second video lines. In an example embodiment, the intermediate circuits include respective pixel amplifiers. In the discussion that follows pixel amplifiers are used as a non-limiting example of the intermediate circuits.

In an example embodiment, the sensor array includes at least one shift register element 108 with a plurality of inputs. In an example embodiment, each shift register element is electrically connected to a plurality of respective pixel amplifiers. The shift register element is for causing, for each group in a plurality of groups of the pixels, simultaneous transmission of signals to only one of the first or second video lines. The respective simultaneous transmissions for the plurality of groups begin at different times. For example, each shift register element is for causing each group in a plurality of groups of pixel amplifiers to simultaneously transmit respective signals from the respective pixels to only one of the first or second video lines. Thus, the shift register element causes groups of the respective pixel amplifiers to sequentially begin transmitting to one or the other of the video lines at different times. In an example embodiment, the plurality of groups of pixel amplifiers includes two groups.

The shift register element is for causing each group in the plurality of groups of the pixel amplifiers to simultaneously transmit in response to respective signals received on the plurality of inputs. In an example embodiment, the plurality of inputs includes logic inputs 110, 112, and 114. In an example embodiment, for a signal on input 110, sensor array 100 operates in a full resolution mode. In a full resolution mode, each pixel amplifier individually transmits to one of the video lines in an alternating sequence. For example, for shift register element 108A, the amplifiers for pixels 101A transmit to line 102 and the amplifiers for pixels 102B transmit to line 104. More specifically, amplifier 106A transmits, then amplifier 106B transmits and the pattern is repeated. For a signal on line 112, the shift register element operates in a half resolution mode and for a signal on input 114 the shift register element operates in a one third resolution mode.

In half resolution mode, groups of two adjacent pixel amplifiers transmit to one of the video lines in an alternating sequence. For example, for shift register element 108B, the amplifiers for pixels 101C transmit to line 102 for the groups of two pixels shown and the amplifiers for pixels 101D transmit to line 104 for the groups of two pixels shown. More specifically, amplifiers 106C/D transmit simultaneously, then amplifiers 106E/F transmit simultaneously and the pattern is repeated. In one third resolution mode, groups of three adjacent pixel amplifiers transmit to one of the video lines in an alternating sequence. For example, for shift register element 108C, the amplifiers for pixels 101E transmit to line 102 for the groups of three pixels shown and the amplifiers for pixels 101F transmit to line 104 for the groups of three pixels shown. More specifically, amplifiers 106G/H/I transmit simultaneously, then amplifiers 106J/K/L transmit simultaneously and the pattern is repeated. In an example embodiment, the respective pixel amplifiers for a shift register element include more than one plurality of groups of pixel amplifiers. For example, for shift register element 108B, there are three pluralities of groups of two amplifiers.

Figure 2:
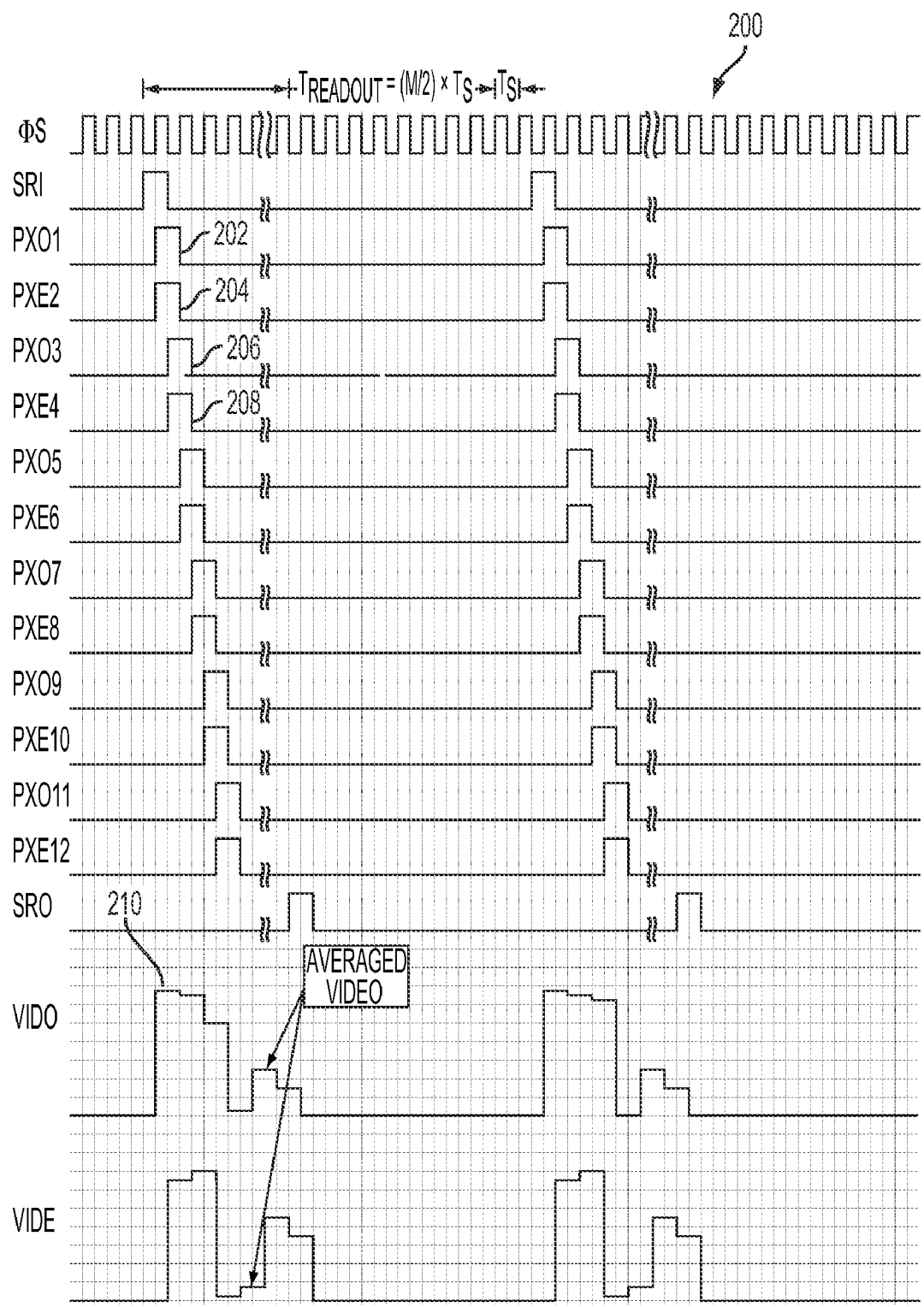
FIG. 2 is a timing diagram showing half resolution for the sensor array shown in FIG. 1.

FIG. 2 is timing diagram 200 showing half resolution operation for sensor array 100 shown in FIG. 1. In half resolution mode, signals from alternating groups of two adjacent pixels are transmitted to one or the other of the video lines. For example, in FIG. 2, in response to input 112 for sensor array 100 in FIG. 1 (half resolution mode), signals PX01 and PXE2 are generated by the shift register element as described infra, causing the output signals from the pixels selected by 202 and 204, the first two adjacent pixels among the pixels connected to a shift register element, to be simultaneously transmitted to one of the video lines, for example, the odd video line. Signals PX03 and PXE4 are generated by the shift register element causing the output signals from the pixels selected by 206 and 208 the next two adjacent pixels among the pixels connected to a shift register element to be simultaneously transmitted to the other of the video lines, for example, the even video line. The pattern then repeats. In an example embodiment, the shift register element is for causing the transmitted signals from each group of pixel amplifiers to be averaged. For example, the output signals from the pixels selected by 202 and 204 are averaged as signal 210. Thus, the resolution is halved. For a signal on input 114 in FIG. 1, a similar process occurs with the exception that signals from three adjacent pixels are transmitted in a group and averaged, resulting in a one third reduction in resolution. Thus, a resolution and readout time of the sensor array is related to the number of pixels in a group. As the number of pixels in a group increases, the resolution and readout time of sensor array 100 decreases.

Figure 3:
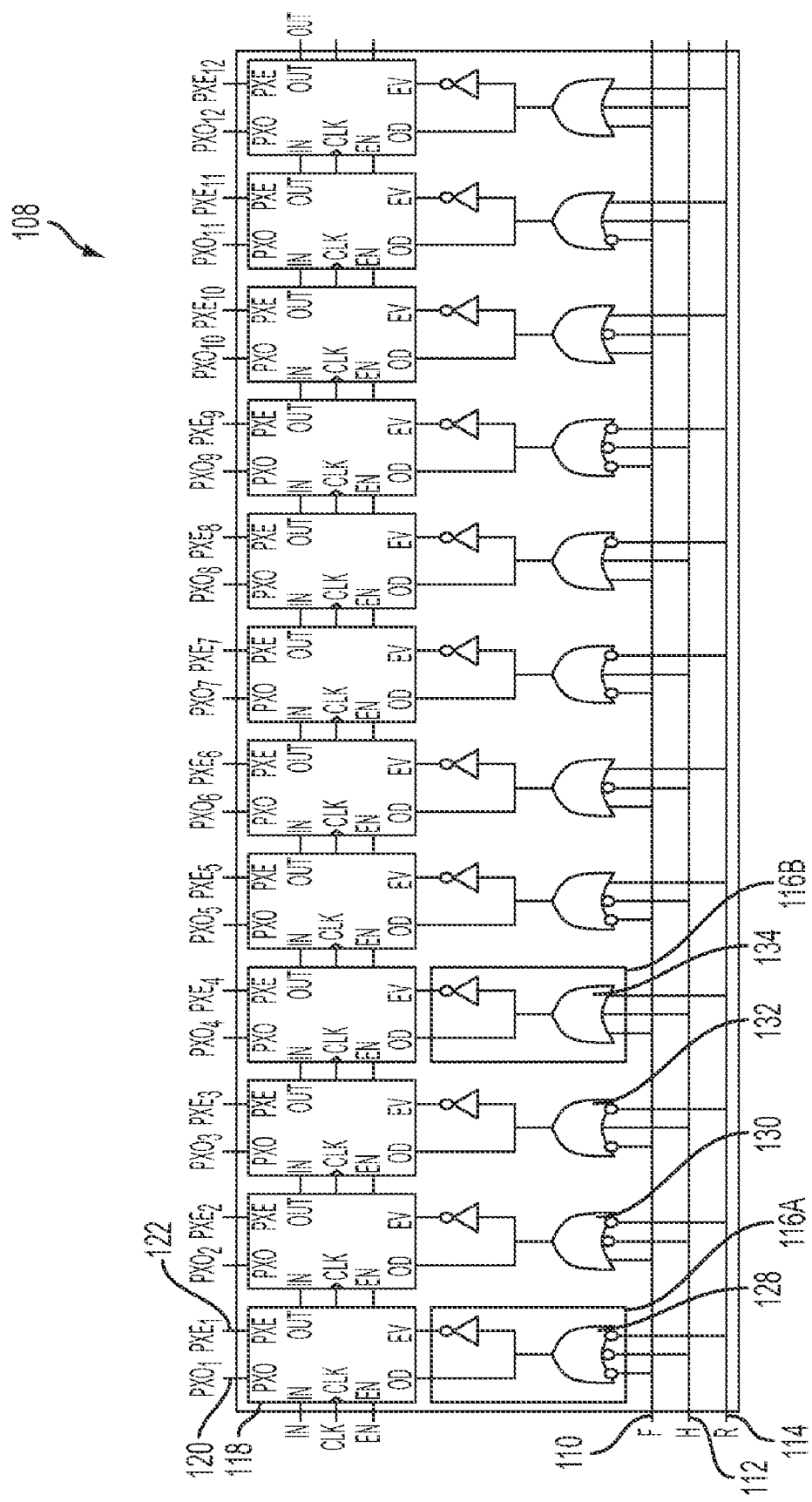
FIG. 3 is a schematic diagram of a shift register element shown in FIG. 1.

FIG. 3 is a schematic diagram of shift register element 108 shown in FIG. 1. Lines 110, 112, and 114 also are designated as F, H, and R, respectively, in FIG. 3. In an example embodiment, the shift register element includes a plurality of logic elements 116, for example, element 116A, and a plurality of shift registers 118. Outputs 120 or 122 also are designated as $PXO_1$ and $PXE_1$, respectively. The remaining outputs are shown as $PXO_n$ and $PXE_n$, with n from 2 to 12. Each logic element is electrically connected to the plurality of inputs for at least one shift register element and each shift register is electrically connected to a respective logic element. Each register includes odd output 120 and even output 122 electrically connected to a respective pixel amplifier (not shown). Thus, unlike the prior art shift register in FIG. 7, each shift register can produce an enable signal for each video line. Each logic element, in response to the signals on the inputs for the shift register element, causes the respective shift register to transmit a signal on one of outputs 120 or 122, causing the respective pixel amplifier to transmit to one of the video lines. In an example embodiment, the configuration of the logic elements varies to accommodate the resolution levels desired. For example, logic element 116A includes a three port OR gate with inverted inputs and logic element 116B includes a three port OR gate. It should be understood that other components or configurations are possible for a shift register element.

Figure 4:
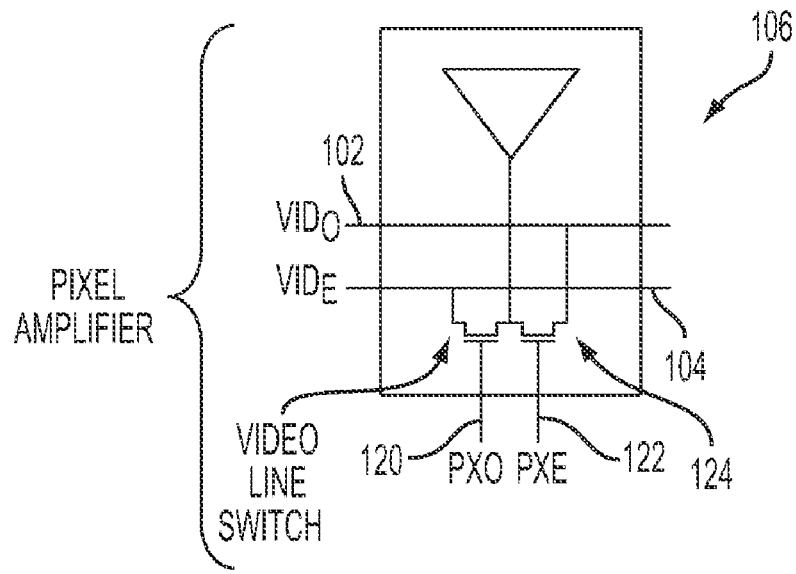
FIG. 4 is a schematic diagram of a pixel amplifier shown in FIG. 1.

FIG. 4 is a schematic diagram of pixel amplifier 106 shown in FIG. 1. In an example embodiment, each pixel amplifier includes a respective switch element 124 electrically connected to a respective shift register, for example, to outputs 120 and 122, and to the video lines. In response to a signal on output 120, the switch connects the pixel amplifier to the odd video line and in response to a signal on output 122; the switch connects the pixel amplifier to the even video line. Thus, unlike the prior art pixel amplifier shown in FIG. 7, amplifier 106 can transmit to either of the video lines via the switch element. It should be understood that other components or configurations are possible for a pixel amplifier.

Figure 5:
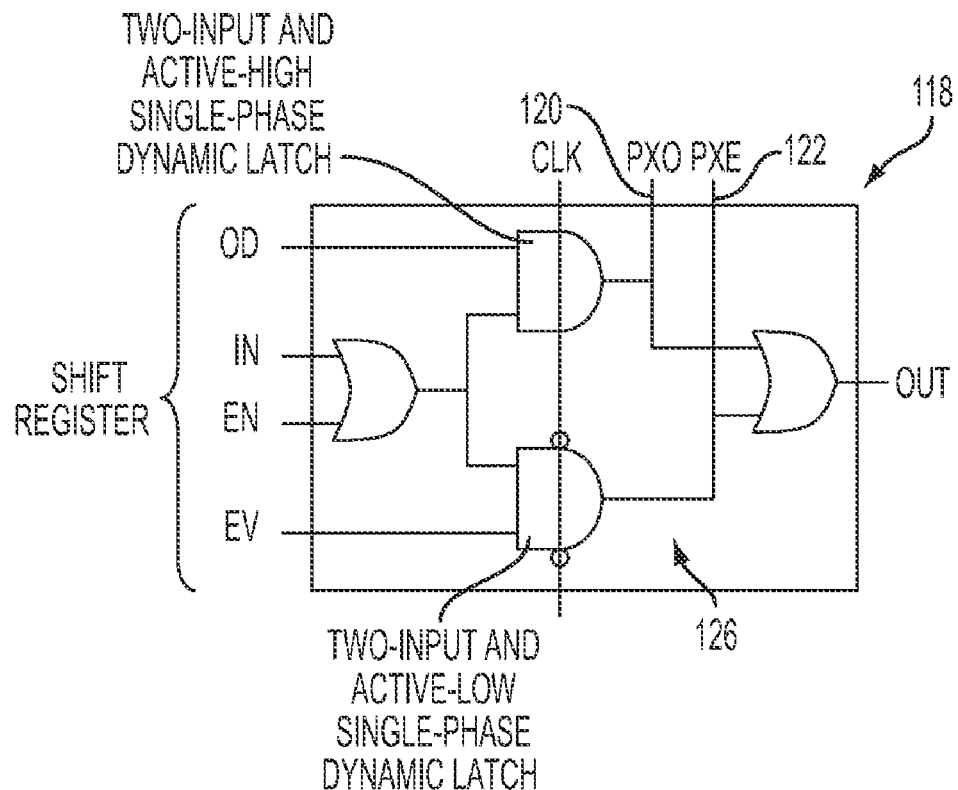
FIG. 5 is a schematic diagram of a shift register shown in FIG. 1.
Figure 7:
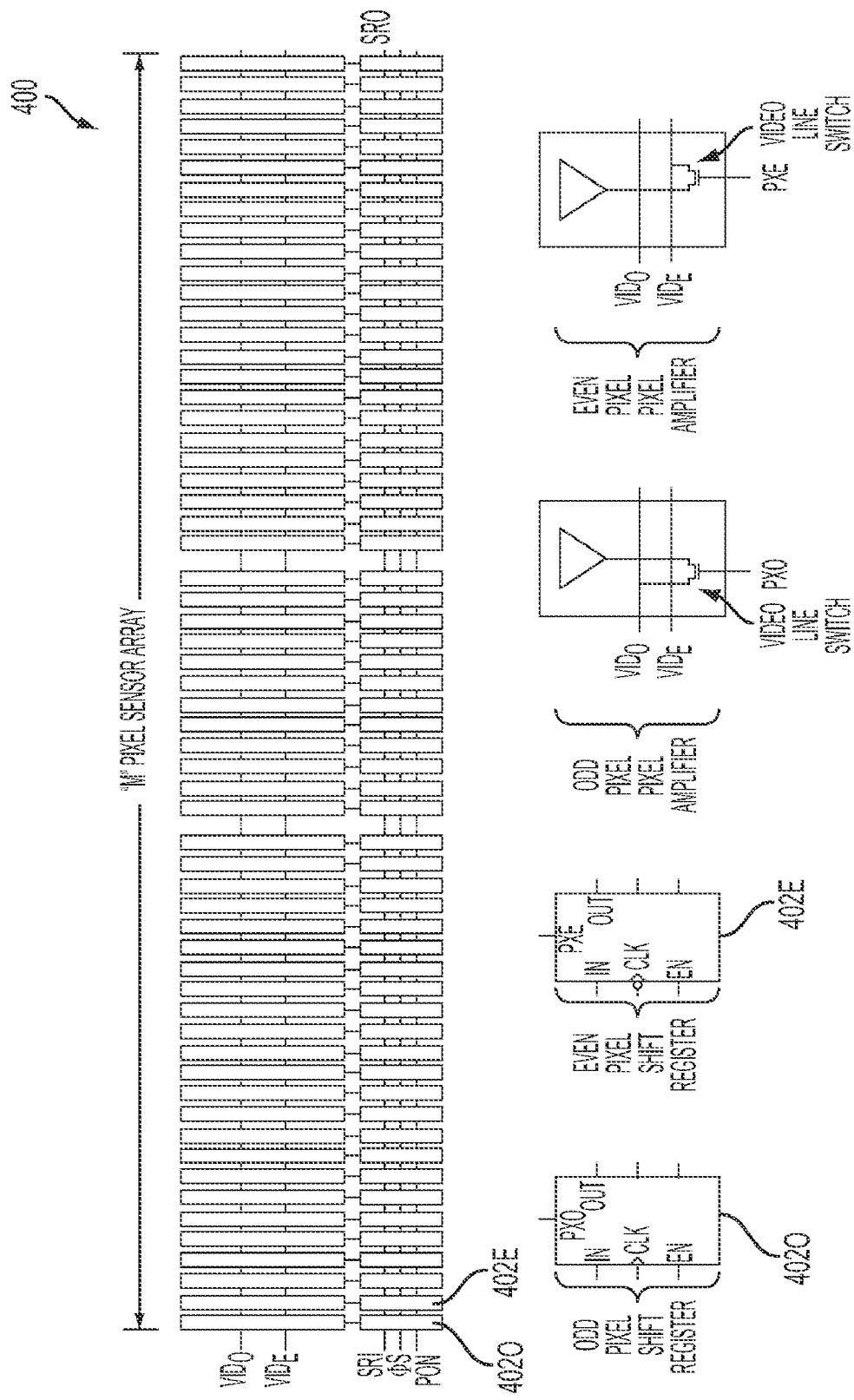
FIG. 7 is a block diagram of a prior art sensor array.

FIG. 5 is a schematic diagram of shift register 118 shown in FIG. 1. In an example embodiment, each shift register receives clock signal SRI on a respective input and each shift register includes latch element 126. The latch element activates output 120 for a rising clock edge and activates output 122 for a falling clock edge assuming other conditions described below are met. Thus, the latch element enables the activation of either of the outputs using a single clock cycle or pulse, which enables a pixel amplifier to transmit to either of the video lines, unlike a prior art pixel amplifier, for example, as shown in FIG. 7, which can only transmit to one or the other of the video lines. It should be understood that other components or configurations are possible for a shift register.

In an example embodiment, shift register 118 includes inputs OD, EV, IN, EN, and CLK. EN enables, or turns on, the shift register and is common to the shift registers. IN is the SRI signal shown in FIG. 2 and initiates readout for the shift register. OD and EV receive signals from logic element 116 as described infra. CLK is common to the shift registers and is shown as $\Phi S$ in FIG. 2.

Returning to FIG. 3, in an example embodiment for half resolution mode, the signal on input 112 is high and the signals on inputs 110 and 114 are low. Logic gates 128 and 130 output a high signal, which results in the connected shift registers receiving a high signal on the OD inputs, which results in the connected pixel amplifiers transmitting to the odd video line. Logic gates 132 and 134 output a low signal, which results in the connected shift registers receiving a high signal on the EV inputs, which results in the connected pixel amplifiers transmitting to the even video line. The pattern then repeats.

Returning to FIG. 2, signals 202 and 204 are transmitted in response to a rising edge of $\Phi S$ and signals 206 and 208 are transmitted in response to a falling edge of $\Phi S$. Thus, both the rising and falling edges of a single clock pulse are used in a single shift register.

FIG. 6 is a block diagram of apparatus 300 including sensor array 100 shown in FIG. 1. In an example embodiment, apparatus 300 is a digital scanner, copier, facsimile machine, or other document generating or reproducing device. Apparatus 300 includes at least one specially programmed computer 302 with processor 304. Computer 302 and processor 304 can be any computer, processor, or memory element known in the art. Processor 304 can be used to provide all or some of the inputs or control functions described supra for sensor array 100.

Thus, sensor array 100 advantageously enables a single sensor array to be used for a variety of resolution settings, increasing the modularity of the sensor array or an apparatus including the sensor array. Sensor array 100 also enables a variety of readout times, for example, advantageously enabling a decrease in readout time for applications requiring higher readout times and with lower resolution requirements. Thus, the sensor array enables higher resolution applications as well as lower readout time applications in a single sensor array.

As noted supra, according to aspects illustrated herein, there is provided a method for modifying resolution of a sensor array. In an example embodiment, the sensor array includes a shift register element with a plurality of inputs, the method includes: the shift register element causing, for each group in a plurality of groups of the pixels, simultaneous transmission of signals to only one of the first or second video lines; and the shift register element causing respective simultaneous transmissions for said plurality of groups to begin at different times. In an example embodiment, causing, for each group in a plurality of groups of the pixels, simultaneous transmission of signals includes causing the simultaneous transmissions in response to signals received on the plurality of inputs. In an example embodiment, the method averages the transmitted signals from said each group of pixels.

In an example embodiment, the sensor array includes a plurality of pixel amplifiers, each pixel amplifier is connected to a respective pixel from the plurality of pixels and includes a respective switch element electrically connected to the first and second video lines; the shift register element includes: a plurality of logic elements, each logic element electrically connected to the plurality of inputs for the at least one shift register element; and a plurality of shift registers, each shift register electrically connected to a respective logic element and to a respective pixel amplifier. The method includes each logic element, in response to the signals on the inputs for the shift register element, causing the respective shift register to cause the respective switch element to electrically connect the respect pixel amplifier to one of the first or second video lines. In an example embodiment, each shift register includes a respective latch element with first and second outputs, the method includes: the respective latch element activating the first output for a rising clock edge and activating the second output for a falling clock edge; for an activate first output, causing the respective pixel amplifier to transmit to the first video line; and for an activate second output, causing the respective pixel amplifier to transmit to the second video line.

In an example embodiment, the shift register element determines a number of pixels in said each group of pixels in response to the plurality of inputs. In an example embodiment, determining the number of pixels in each group of pixels includes increasing the number to decrease the resolution of the sensor array. In an example embodiment, determining the number of pixels in each group of pixels includes increasing the number to decrease the readout time of the sensor array.

Although the examples above show or reference a specific number, type, and configuration of inputs or components, it should be understood that according to aspects illustrated herein, other numbers, types, or configurations of inputs or components are possible. For example, other numbers of logic inputs are possible, resulting in: other numbers of groups in a plurality of pixel amplifiers that simultaneously transmit to the same video line; other numbers of pluralities of amplifier groups possible for a single shift register elements; and other numbers of pixel amplifiers in a group of pixel amplifiers.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A sensor array, comprising:
   a shift register element with a plurality of inputs;
   a plurality of pixels;
   first and second video lines; and,
   a plurality of intermediate circuits, each intermediate circuit electrically connected to a single respective pixel from the plurality of pixels and electrically connected to both the first and second video lines, wherein the shift register element is for causing, for each group in a plurality of groups of the pixels, simultaneous transmission of signals to only one of the first or second video lines, respective simultaneous transmissions for said plurality of groups beginning at different times.

2. The sensor array of claim 1, wherein said each intermediate circuit includes a respective pixel amplifier.

3. The sensor array of claim 1 wherein the shift register element is for causing said respective simultaneous transmissions in response to signals received on the plurality of inputs.

4. The sensor array of claim 1 wherein the shift register element is for causing the transmitted signals from said each group of pixels to be averaged.

5. The sensor array of claim 3 wherein said each intermediate circuit includes a respective pixel amplifier connected to the respective pixel and including a respective switch element electrically connected to the first and second video lines, wherein:
the shift register element includes:
a plurality of logic elements, each logic element electrically connected to the plurality of inputs for the at least one shift register element; and,
a plurality of shift registers, each shift register electrically connected to a respective logic element and to a respective pixel amplifier; and,
said each logic element, in response to the signals on the inputs for the shift register element, causes the respective shift register to cause the respective switch element to electrically connect the respect pixel amplifier to one of the first or second video lines.

6. The sensor array of claim 5 wherein:
said each shift register includes a respective latch element with first and second outputs;
the respective latch element activates the first output for a rising clock edge and activates the second output for a falling clock edge;
an activate first output causes the respective pixel amplifier to transmit to the first video line; and,
an activate second output causes the respective pixel amplifier to transmit to the second video line.

7. A method for modifying resolution of a sensor array, the array including a shift register element with a plurality of inputs, first and second video lines, a plurality of pixels, and a plurality of intermediate circuits; and, comprising:
electrically connecting each intermediate circuit to a single respective pixel and to the first and second video lines;
for a first mode, transmitting a signal from a pixel in the plurality of pixels to the first video line via a respective intermediate circuit from the plurality of intermediate circuits;
for a second mode, transmitting a signal from the pixel in the plurality of pixels to the second video line via the respective intermediate circuit from the plurality of intermediate circuits;
the shift register element causing, for each group in a plurality of groups of the pixels, simultaneous transmission of signals to only one of the first or second video lines; and,
the shift register element causing respective simultaneous transmissions for said plurality of groups to begin at different times.

8. The method of claim 7 wherein causing, for each group in a plurality of groups of the pixels, simultaneous transmission of signals includes causing said simultaneous transmissions in response to signals received on the plurality of inputs.

9. The method of claim 7 further comprising averaging the transmitted signals from said each group of pixels.

10. The method of claim 7 wherein:
the sensor array includes a plurality of pixel amplifiers, each pixel amplifier connected to a respective pixel from the plurality of pixels and including a respective switch element electrically connected to the first and second video lines;
the shift register element includes:
a plurality of logic elements, each logic element electrically connected to the plurality of inputs for the at least one shift register element; and,
a plurality of shift registers, each shift register electrically connected to a respective logic element and to a respective pixel amplifier, the method further comprising said each logic element, in response to the signals on the inputs for the shift register element, causing the respective shift register to cause the respective switch element to electrically connect the respective pixel amplifier to one of the first or second video lines.

11. The method of claim 10 wherein said each shift register includes a respective latch element with first and second outputs, the method further comprising:
the respective latch element activating the first output for a rising clock edge and activating the second output for a falling clock edge;
for an activate first output, causing the respective pixel amplifier to transmit to the first video line; and,
for an activate second output, causing the respective pixel amplifier to transmit to the second video line.

12. The method of claim 7 further comprising the shift register element determining a number of pixels in said each group of pixels in response to the plurality of inputs.

13. The method of claim 12 wherein determining the number of pixels in said each group of pixels includes increasing the number to decrease the resolution of the sensor array.

14. The method of claim 12 wherein determining the number of pixels in said each group of pixels includes increasing the number to decrease the readout time of the sensor array.

15. An apparatus for modifying resolution of an image, comprising:
a sensor array including:
a shift register element with a plurality of inputs;
first and second video lines;
a plurality of pixels; and,
a plurality of intermediate circuits, each intermediate circuit electrically connected to a single respective pixel and to the first and second video lines; and,
a processor for at least one specially programmed computer for controlling signals from the plurality of pixels to the first and second video lines via the plurality of intermediate circuits, wherein the shift register element is for causing, for each group in a plurality of groups of the pixels, simultaneous transmission of signals to only one of the first or second video lines, respective simultaneous transmissions for said plurality of groups beginning at different times.

16. The apparatus of claim 15 wherein said each intermediate circuit includes a respective pixel amplifier.

17. The apparatus of claim 15 wherein:
the sensor array includes a plurality of pixel amplifiers, each pixel amplifier connected to a respective pixel from the plurality of pixels and including a respective switch element electrically connected to the first and second video lines;
the shift register element includes:
a plurality of logic elements, each logic element electrically connected to the plurality of inputs for the at least one shift register element; and, a plurality of shift registers, each shift register electrically connected to a respective logic element and to a respective pixel amplifier; and, said each logic element, in response to the signals on the inputs for the shift register element, causes the respective shift register to cause the respective switch element to electrically connect the respect pixel amplifier to one of the first or second video lines.

18. The apparatus of claim 17 wherein:

said each shift register includes a respective latch element with first and second outputs;

the respective latch element activates the first output for a rising clock edge and activates the second output for a falling clock edge;

an activate first output causes the respective pixel amplifier to transmit to the first video line; and, an activate second output causes the respective pixel amplifier to transmit to the second video line.

\* \* \* \* \*